Patented July 12, 1932

1,866,558

UNITED STATES PATENT OFFICE

ISAAK J. FRENKEL, OF MOSCOW, UNION OF SOCIALIST SOVIET REPUBLICS

VISCOSE MANUFACTURING

No Drawing. Application filed December 20, 1928, Serial No. 327,461, and in Union of Socialist Soviet Republics December 9, 1927.

My invention relates to the viscose manufacturing and has particular reference to the process of making a liquid solution of cellulose for the manufacturing of artificial silk or rayon.

The viscose which is used for this purpose is prepared by treating a paper pulp in a solution of caustic soda with a subsequent treatment with carbon disulphide. During the spinning process the viscose threads are fixed in a bath containing a solution of sulphuric acid.

This process has a certain disadvantage that during the spinning operation such gases are liberated as hydrogen sulphide (sulphuretted hydrogen, $H_2S$), sulphur dioxide ($SO_2$) also vaporized carbon disulphide ($CS_2$). All these gases are not only ill smelling but are also injurious to the operators' health.

The object of my invention is to improve this process so as to eliminate the formation of such injurious gases. For this purpose I treat the viscose with a small quantity of salts of nitrous acid or nitrites. I found that it is sufficient to use such nitrites in quantities less than one per cent of the weight of viscose (usually 0.3 to 0.4%).

The salt should be added to the viscose in the process of its preparation, preferably by dissolving it in a container with caustic soda. Sodium nitrite ($NaNO_2$) may be used for this purpose.

The principal action of the nitrous acid consists in oxidizing free hydrogen sulphide with precipitation of free sulphur which partly settles on the thread giving it a brownish tint. This tint, however, disappears with a subsequent treatment of the threads.

I also found that the presence of nitrous acid considerably reduces liberation of carbon disulphide and of sulphur dioxide, so that the air in the rayon plant becomes quite free from noxious odors and of injurious gases. This causes disappearance of the eye disease of the workmen which is known as "weavers professional disease". The improvement in hygienic conditions, of course, tends to increase the efficiency of the operators.

The elimination of the free hydrogen sulphide tends to increase the evenness of the thread and its quality.

The determination of the degree of maturity of the viscose in my process is made not by titration with iodine, but by coagulation in ammonium chloride or by quantitative determination of carbon disulphide in the xanthogenate of the viscose.

The reaction of the nitrous acid on hydrogen sulphide and on carbon disulphide is represented by the following formulas:

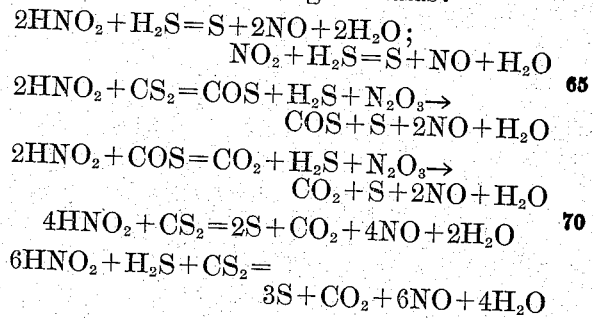

The sodium nitrite acts principally as a catalyst in oxidizing the sulphuretted hydrogen into sulphur, resembling its action in oxidizing large quantities of sulphur dioxide into trioxide of sulphur, when used for making sulphuric or nitric acids.

Sulphur dioxide forming in this process does not become free, as it becomes deoxidized into sulphur due to the excess of $H_2S$, according to the following equation:

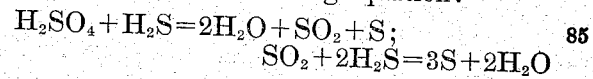

I claim as my invention:

A method for preparing viscose for manufacturing artificial silk, consisting in adding salts of nitrous acid to the solution of caustic alkali used in preparation of said viscose, the amount of said salts being sufficient to oxidize sulphurous gases formed during the process of spinning and fixation in acid bath.

In testimony whereof I have affixed my signature.

ISAAK J. FRENKEL.